United States Statutory Invention Registration [19]

[11] Reg. Number: H412

Miller, Jr. et al. [43] Published: Jan. 5, 1988

[54] COORDINATE POSITION DETECTOR

[75] Inventors: Walter E. Miller, Jr.; Robert R. Mitchell, both of Hunstville; Michael M. Jones, Arab, all of Ala.

[73] Assignee: The United States of America as represented by the Secretary of the Army, Washington, D.C.

[21] Appl. No.: 900,879

[22] Filed: Aug. 25, 1986

[51] Int. Cl.[4] ..... G01J 1/20; F24J 2/38

[52] U.S. Cl. ..... 250/203 R; 126/425

[58] Field of Search ..... 250/203 R, 203 S; 126/425; 356/141, 152

[56] References Cited

U.S. PATENT DOCUMENTS

| | | | |
|---|---|---|---|
| 3,951,550 | 4/1976 | Slick | 356/141 |
| 4,018,532 | 4/1977 | Fletcher | 250/203 S |
| 4,136,568 | 1/1979 | Seymour | 356/141 |
| 4,193,689 | 3/1980 | Reymond et al. | 356/152 |
| 4,209,254 | 6/1980 | Reymond et al. | 356/141 |
| 4,211,922 | 7/1980 | Vaerewyck et al. | 250/203 S |
| 4,297,572 | 10/1981 | Carlton | 250/203 S |
| 4,314,761 | 2/1982 | Reymond et al. | 356/141 |
| 4,315,690 | 2/1982 | Trocellier et al. | 250/203 R |
| 4,500,200 | 2/1985 | Kleinhans | 356/141 |
| 4,612,488 | 9/1986 | Uhlemann et al. | 250/203 S |

*Primary Examiner*—Stephen C. Buczinski

*Assistant Examiner*—Linda J. Wallace

*Attorney, Agent, or Firm*—Freddie M. Bush; Robert C. Sims

[57] ABSTRACT

A linear detector array is positioned a fixed distance behind a narrow slot in an opaque mask. The array is oriented perpendicular to the slot as viewed from the "front", or direction of laser energy arrival. Light from the laser source, limited by the mask and slot, falls on only a few adjacent elements of the detector array, depending on the direction of arrival of the light. Further, since such crossed linear elements (slots and array) provide this measure of angle of arrival in the single direction perpendicular to the slot, two such systems of mask, detector linear array, and processing electronics may be employed (one rotated 90 degrees with respect to the other) to provide 'vertical' and 'horizontal' measurements of direction to the laser source.

3 Claims, 6 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

COORDINATE POSITION DETECTOR

DEDICATORY CLAUSE

The invention described herein may be manufactured, used, and licensed by or for the Government for governmental purposes without the payment to us of any royalties thereon.

BACKGROUND OF THE INVENTION

Current methods of measuring angle of arrival vary from simple staring lens systems with a blur circle centroid measuring detector configuration (such as a 4-quadrant detector element), to very complex arrays, or alternatively utilize scanning mechanisms or rotating-/nutating reticles. Techniques utilizing scanning of any mechanization are of no value in the detection of a single descrete event in time, such as a laser pulse. *Infrared System Engineering, John Wiley & Sons,* 1969; and of particular applicability, section 6.4 of that chapter.

Those non-scanning methods which require lenses are limited to relatively narrow spectral regions by the transmission of the lens material, and cannot be used to sense high power lasers due to the possibility of detector damage from concentration of power by the lens.

Some non-imaging methods have been investigated that solve these two problems, but are very complex both optically and electronically. In addition such methods require complex trigonometric calculatons to convert the 3 dimensional angles measured to true azimuth and elevation.

It is highly desirable that the two (vertical and horizontal) channels of the locator be independent, i.e., laser movement in space in one axis does not alter the output of the channel measuring perpendicular to that axis. It is further highly desirable that these vertical and horizontal measurements be in the true azimuth (outer gimbal) and elevation (inner gimbal) axes, since this angular coordinate system is used by virtually all systems with which the locator may be required to interface. A major feature of this invention is the very simple achievement of such independent azimuth and elevation measurement capability without crosstalk from motion in the perpendicular axis.

SUMMARY OF THE INVENTION

This invention is a device which, when illuminated by optical radiation such as a laser beam, will, within a large field-of-view, broad range of energy levels, broad range of wavelengths, and in the appropriate coordinate system, measure the direction from which it came.

A linear detector array is positioned a fixed distance behind a narrow slot in an opaque mask. The array is oriented perpendicular to the slot as viewed from the "front", or direction of laser energy arrial. Light from the laser source, limited by the mask and slot, falls on only a few adjacent elements of the detector array, depending on the direction of arrival of the light. Further, since such crossed linear elements (slot and array) provide this meansure of angle of arrival in the single direction perpendicular to the slot, two such systems of mask, detector linear array, and processing electronics may be employed (one rotated 90 degrees with respect to the other) to provide 'vertical' and 'horizontal' measurements of direction to the laser source.

It is highly desirable that the two (vertical and horizontal) channels of the locator be independent, i.e., laser movement in space in one axis does not alter the output of the channel measuring perpendicular to that axis. It is further highly desirable that these vertical and horizontal measurements be in the true azimuth (outer gimbal) and, elevation (inner gimbal) axes, since this angular coordinate system is used by virtually all systems with which the locator may be required to interface. A major feature of this invention is the very simple achievement of such independent azimuth and elevation measurement capability without crosstalk from motion in the perpendicular axis. This independent, direct measurement is a result of the proper optical design of the planar and cylindrical slotted masks.

Due to the different definations of "vertical" angles, the slotted masks are planar for the "horizontal" and cylindrical for the "vertical" directional sensors.

DETAILED DESCRIPTION OF THE PREFERRED EMBODIMENT AND BEST MODE

Figure 1:
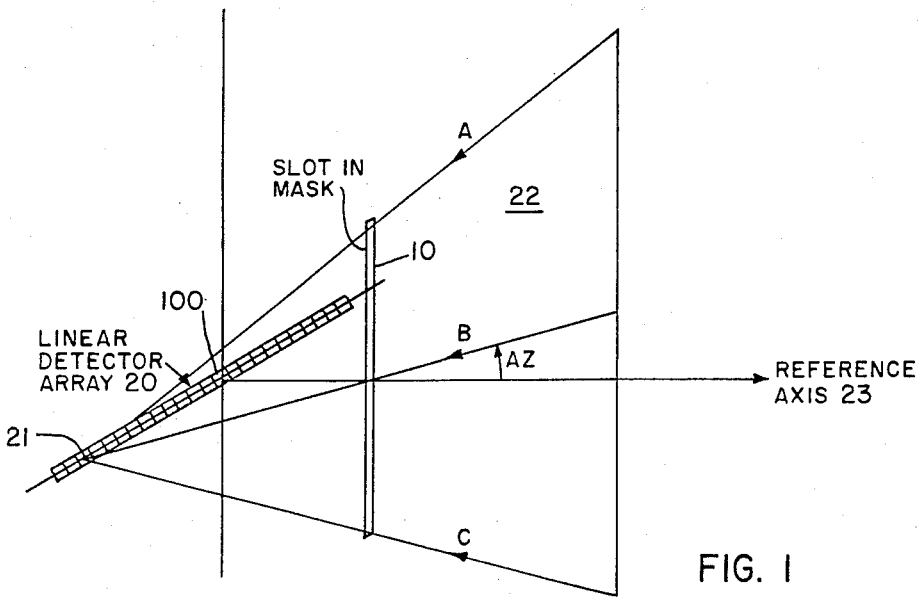
FIG. 1 is an illustration of the principle of the azimuth sensor. (linear slot in planar mask).
Figure 5:
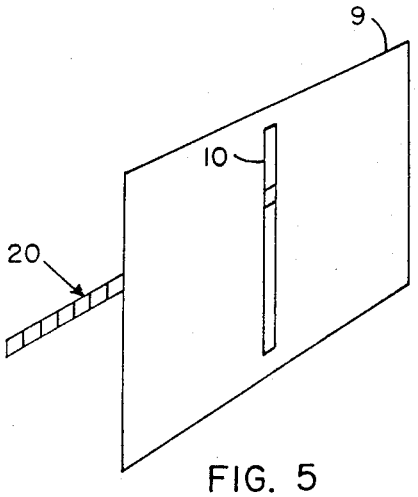
FIGS. 5 and 6 show the masking slots in more physical detail.

There are two independent orthogonal sensors each containing a linear detector array located a fixed distance behind, and perpendicular to, a slotted mask. For the azimuth sensor, the mask consists of a straight slot 10 in a planar surface, as shown in FIGS. 1 and 5. Referring to FIG. 1, the vertical linear slot 10, only, is shown along with the horizontal linear detector array 20. Rays from all vertical directions, represented by A, B, and C in FIG. 1, which pass through the slot 10 and fall on a single detector 21 location originate from within a single vertical plane 22 (a point=the detector 21, and a line=the slot, uniquely define this plane). The zero azimuth plane is similarly defined by slot 10 and zero detector 100. Azimuth AZ is defined as the angle between this zero azimuth plane and an observed plane such as plane 22, which is "measured" by activation of detector 21 by any one of he laser rays A, B. or C. Therefore, this sensor measures true azimuth (i.e., defines plane 22) independent of elevation. (Ray A, B, or C).

Figure 2:
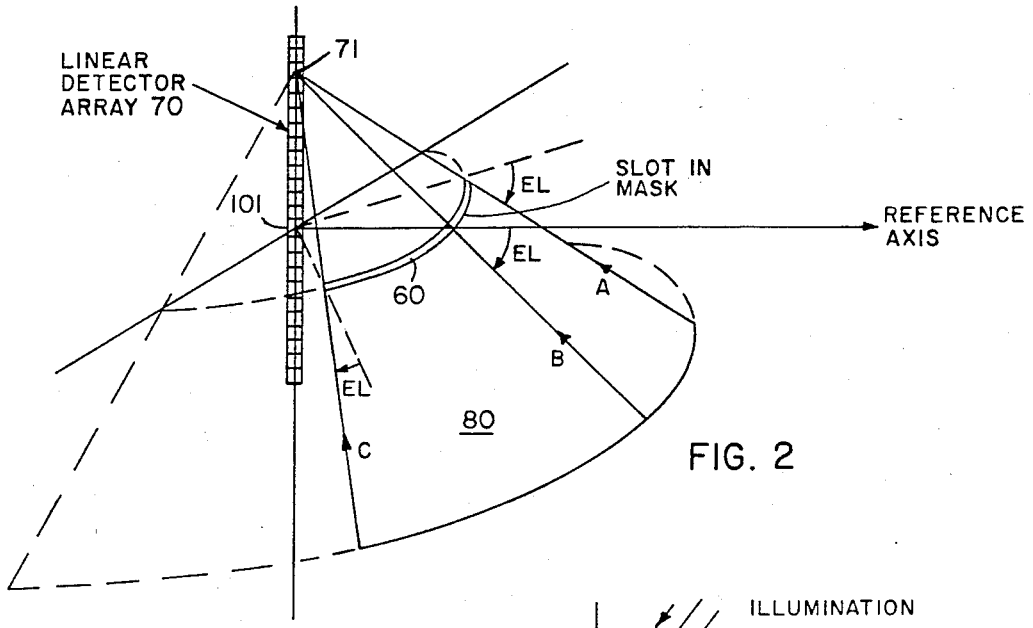
FIG. 2 is an illustration of the elevation sensor. (curved slot in a cylindrical mask).
Figure 6:
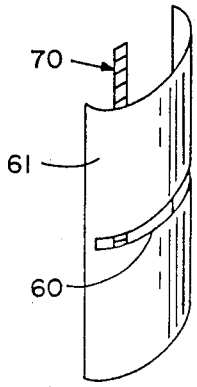

For the elevation sensor the configuration is shown in FIGS. 2 and 6, and consists of a vertical linear detector array 70, which is centered at the axis of cylindrical mask 61, and horizontal circular segment slot 60 in this mask. An elevation reference surface is uniquely defined by the horizontal plane which contains the circular segment slot 60. The detector in vertical linear array 70 which lies within this horizontal plane is selected as the zero detector 101 for measurement purposes.

Rays from all horizontal directions, represented by A, B, and C in FIG. 2, which pass through the curved slot 70 and fall on a single detector 71 location originate from the same angle above or below this horizontal reference plane. The geometric surface 80 defined by detector element 71 and all rays (A, B, and C) are at a common elevation angle (the slope of the cone surface), independent of the azimuth angle. Therefore this sensor measures true elevation angle (i.e. defines cone 80) independent of azimuth angle (ray A, B, or C).

Figure 3:
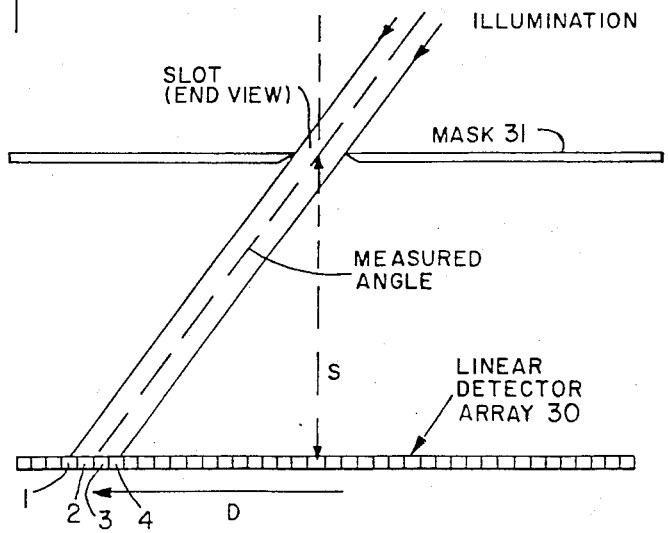
FIG. 3 is a detailed view of the mask and the detector array, a cross section through the mask (either planar or cylindrical) that includes the detector array.

Various methods may be used to convert the detector illumination into angular information. It is likely that one would choose a slot width in the mask 31 which is wider than the width on a single detector, so that several adjacent detectors 1–4 in the linear array 30 would be illuminated as shown in FIG. 3. Then, simple electronic calculations such as threshold or amplitude weighted centroid would give the precise beam centroid location on the detector array. Azimuth and elevation are then easily calculated as follows:

Azimuth = arctan (D/S), azimuth sensor.

Elevation = arctan (D/S), elevation sensor.

where:

D = illum. centroid location relative to center detector of detector array.

S = distance from center of slot to center of detector array.

In practice, the centroid and arc tangent function may be easily accomplished by a microprocessor, perhaps using an arc tangent look-up table to avoid a time consuming computation.

Figure 4:
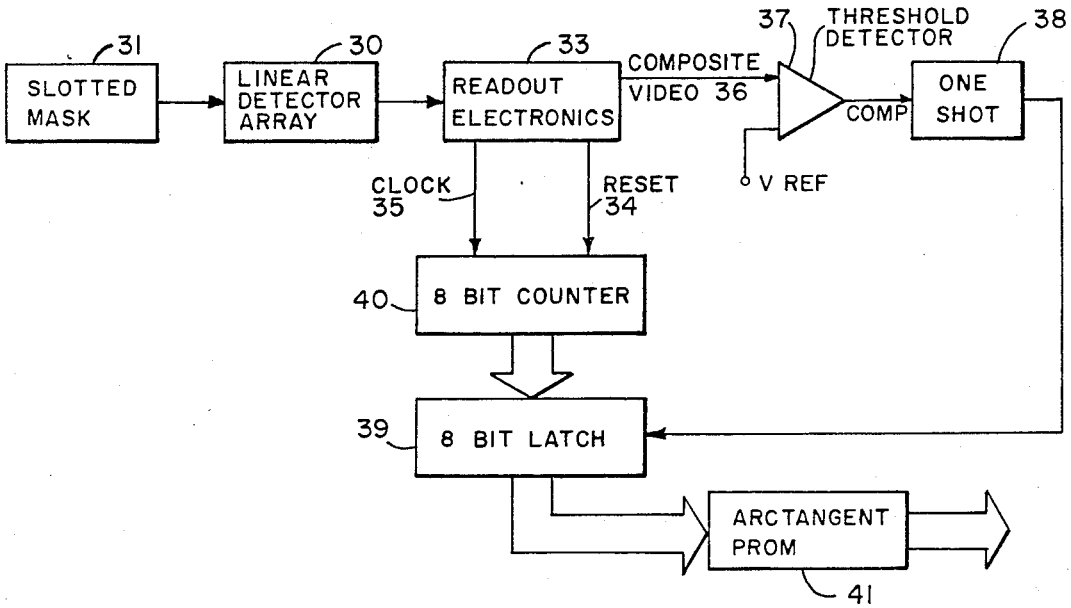
FIG. 4 is a block diagram illustrating a system for deriving a coordinate output for the system, either azimuth or elevastion.

FIG. 4 is a block diagram of one channel of the invention, including a simplified version of the processing electronics. As indicated in the summary, various implementations of this method are easily envisioned, including a mircoprocessor which could add centroid weighting to the angle measurent rather than the simple threshold indicated by the embodiment of FIG. 4. The light source to be measured (angular location) inputs light through the slotted mask 31 to the linear detector array 30. This slotted mask can be either planar or cylindrical, and as previously discussed, a complete two axis sensor should include one of each. The linear array 30 is preferably a pyroelectric device and thus responsive to a very large band of energy from ultraviolet to infrared and even mircowave. Spiricon manufactures a series of such linear pyroelectric arrays, such as model BP-64-220-ZnSe, which are ideal for this application. In fact this series of detector arrays comes with read-out electronics which output sequentially the analog voltages from successive detector elements along the array.

Using the Spiricon device for both the linear array 30 and the readout electronics 33 simplifies the component count. The Spiricon provides three useful outputs: (1) A reset pulses 34, which occurs at the beginning of the array readout time. (2) A clock 35, which is syncronous to the detector element readout times. (3) A "composite video" output signal 36, with the voltage level during a particular clock cycle being representative of the optical power on a particular detector element unique to that clock cycle.

This video signal is provided to a threshold comparator 37, which toggles whenever its input exceeds a preset level (indicative of optical reception). This is then input to a one-shot 38 which simply insures an appropriate pulse width for the hold function of the 8 bit latch 39.

The reset pulse 34, which occurs in the readout electronics at the beginning of each detector array readout time, is provided to the 8 bit counter 40 to clear it in preparation for beginning a new count. After each such reset pulse, the counter accumulates the number of clock cycles output from the readout electronics. Each clock cycle occurs during a time period when the signal amplitude from one detector element of the array is present on the composite video, and this cumulative count thus indicates which element is being output at any particular time.

Whenever an optical input (above the preset amplitude) occurs, the composite video will cause the one-shot to toggle during the next array readout. The output latch will follow its input during this period (one-shot high), which is the counter cumulative count at the time the high signal detector signal is output. When the one-shot times out, the latch will retain this cumulative count independent of counter further action. This action 39 then contains the digital address (D of FIG. 3) of the first detector element of array 30 which received an optical signal above threshold. The latch provides this parallel data format signal to the input of a prom 41, which is programmed to output Arctangent (D/S), which is the true azimuth (or elevation) angle of arrival of the optical beam. As seen from FIG. 3, S is a constant for a manufactured sensor, and is thus not required as an input for the arctangent (D/S) function only D. The digital address from the latch can vary over the range of 0 to 2N, compared to the mathematically correct −N to +N (where N is the number of detectors from the array center to the detector being illuminated), but this offset is easily included in the arctangent prom 41.

Two such channels (FIG. 4), one with planar mask and one with cylindrical mask, form a complete two axis angle of arrival sensor with independent azimuth and elevation output signals.

We claim:

1. A system for determining at least one coordinate of an arrival angle of electromagnetic energy eminating from distant source comprising a plurality of electromagnetic energy detectors arranged in a line, a first means which is opaque to electromagnetic energy which is positioned spatially from said electomagnetic detectors and between said source and said detectors, said first means having a slot for allowing electromagnetic energy from said source to pass through said first means and to impinge upon selective ones of said plurality of detectors in accordance with the angle of the arrival of the electromagnetic energy from said source; said first means is at least part of a cylindrical surface located from said detectors such that the line of the detectors is located on its cylindrical axis, said slot in said first means being perpendicular to said axis such that it will project a straight line onto the detectors which is perpendicular to the line of the detectors, and said detectors being located in a vertical plane and said slot being located in a horizontal plane such that the detector illuminated by incoming electromagnetic energy can be calibrated such that it represents an elevation coordinate of said incoming electromagnetic energy.

2. A system as set forth in claim 1 further comprising a second set of a plurality of electromagnetic detectors arranged in a line, a second means located between said source and said second set of detectors, said second means being opaque to the electromagnetic energy of said source, said second means being a planar device having a straight line slot therein for transmitting electromagnetic energy from said source, said second set of detectors being arranged such that they will fit into a horizontal plane, and said second means having its slot positioned in a straight line such that when projected onto said second set of detectors will be perpendicular thereto whereby the detector being illuminated by the electromagnetic energy from the source can be calibrated so as to represent an azimuth coordinate of the direction of the incoming electromagnetic energy from said source.

3. A system as set forth in claim 2 further comprising a plurality of azimuth and elevation determining subsystems so as to provide for greater angular detection of said source.

* * * * *